March 5, 1963 R. W. HELDA 3,079,958
APPARATUS FOR PROCESSING ELECTRONIC COMPONENTS
Filed Feb. 1, 1961 6 Sheets-Sheet 1

INVENTOR.
ROBERT W. HELDA
BY Mueller & Aichele
ATT'YS.

March 5, 1963 R. W. HELDA 3,079,958

APPARATUS FOR PROCESSING ELECTRONIC COMPONENTS

Filed Feb. 1, 1961 6 Sheets-Sheet 2

INVENTOR.
ROBERT W. HELDA
BY Mueller & Aichele
ATT'YS.

March 5, 1963 R. W. HELDA 3,079,958

APPARATUS FOR PROCESSING ELECTRONIC COMPONENTS

Filed Feb. 1, 1961 6 Sheets-Sheet 3

INVENTOR.
ROBERT W. HELDA
BY Mueller & Aichele
ATT'YS.

INVENTOR.
ROBERT W. HELDA
BY Mueller & Aichele
ATT'YS.

March 5, 1963 R. W. HELDA 3,079,958

APPARATUS FOR PROCESSING ELECTRONIC COMPONENTS

Filed Feb. 1, 1961 6 Sheets-Sheet 5

INVENTOR.

ROBERT W. HELDA

BY Mueller & Aichele

ATT'YS.

INVENTOR.
ROBERT W. HELDA
BY Mueller & Aichele
ATT'YS.

United States Patent Office 3,079,958

Patented Mar. 5, 1963

3,079,958

APPARATUS FOR PROCESSING ELECTRONIC COMPONENTS

Robert W. Helda, Scottsdale, Ariz., assignor to Motorola, Inc., Chicago, Ill., a corporation of Illinois Filed Feb. 1, 1961, Ser. No. 86,424

7 Claims. (Cl. 140—147)

This invention relates generally to apparatus whose purpose is to improve the physical condition of the lead portions of electronic components, and relates more specifically to a machine for very high speed fully automatic straightening and positioning of the electrical leads of semiconductor devices such as transistors.

Many semiconductor devices have two or more lead wires projecting from the main body of the unit. When the lead wires and other parts of the devices have been fabricated and assembled into final form, they often go through further processing which requires that the leads be straight and in optimum positions. For instance, the units may be placed in test sockets, fixtures or carriers which will not accept the leads if they are unduly bent. Some semiconductor devices are very small, and it is common to handle such units in bulk. With this type of handling it is not unusual for the leads to become entwined and bent. Consequently, it becomes necessary to straighten and locate the leads in order to prepare the units for further processing. This also serves to improve the appearance of the units, thus adding to their commercial appeal.

Mass production situations, which are common in the manufacture of semiconductor devices, require equipment that can operate at very high speeds in the terms of the number of units processed per unit of time, and it is preferable that it should operate unattended and with a minimum of maintenance time required. Known lead straightening equipments for semiconductor units have not fulfilled these mass production requirements to the extent desired. The difficulty of providing equipment for straightening the leads of semiconductor devices on a mass production basis is partly due to the very small size of many semiconductor devices. For example, high frequency transistors usually have a body portion which is not much larger than an ordinary match head, and the leads which extend from that body are obviously closely spaced and quite delicate. Since the spacing between the leads is very small, and since they all emerge from the body of the transistor at one end, the matter of proper straightening is complicated because of the difficulty of working in such a limited space.

Once the leads are straightened, it is undesirable to have them return partially to their original distorted positions. Equipment that has been available heretofore forces the leads into the desired positions by clamping them between flat surfaces which apply force continuously along the entire length of the leads. After such processing the leads tend to spring back to their original position, and thus a proper straightening job is not accomplished. It is desirable to position the leads with a high degree of accuracy, and such results have not been possible with the equipment that has been available. In situations where leads are entwined, existing machines require that a person manually untangle the leads before placing the device in the straightener.

An object of the present invention is to provide precise and permanent lead straightening and locating action on the leads of semiconductor devices such as transistors and rectifiers.

Another object of the invention is to provide a high speed mass production type lead straightener machine which can be readily integrated into a mechanized production line.

Another object of the invention is to provide a straightener machine that is able to process devices whose leads are entwined and distorted without the necessity for any prior manual lead straightening or combing operation.

A feature of the invention is the provision of a machine which has precise and permanent lead straightening and locating action wherein the leads are put into their optimum positions with great accuracy, such as within tolerances of plus or minus five-thousandths of an inch. This is made possible by the progressive clamping action of sequentially operated pairs of straightener members having jaws at their inner ends. The configuration of the jaws is such that all of the leads of one device are grasped, compressed and located at the same time, but with each lead this action takes place progressively along the length of the lead so as to positively locate and straighten the lead and eliminate any tendency for it to return to its original position.

Another feature of the invention is a straightening machine which includes a series of pairs of clamping members in the form of plates provided with jaws and arranged in stacks on opposite sides of a work position, and a simple but effective cam drive which causes the plate pairs to move successively toward the work position so that pairs of plate jaws enclose and operate on the leads. The straightening and driving action is such that the machine can easily be integrated into a fully mechanized production line.

Another feature of the invention is the ability of the machine to process semiconductor devices which have entwined and distorted leads, and this is accomplished by the action of the plate jaws referred to above where the first pair of jaws to contact the leads operates on the lead portions at a point very close to the place where the leads come out of the device, and additional pairs of jaws operate in succession along the entire length of the leads. The lead portions are close to their optimum positions at the place where they emerge from the body of the device because they are all rigidly located by the solid material of the device. Thus, the straightening action is carried out in a series of straightening steps wherein the beginning steps involve lead portions which are in nearly correct positions, and this is important to proper straightening action and prevents jamming or lead deformation.

Referring now to the drawings.

Figure 1:
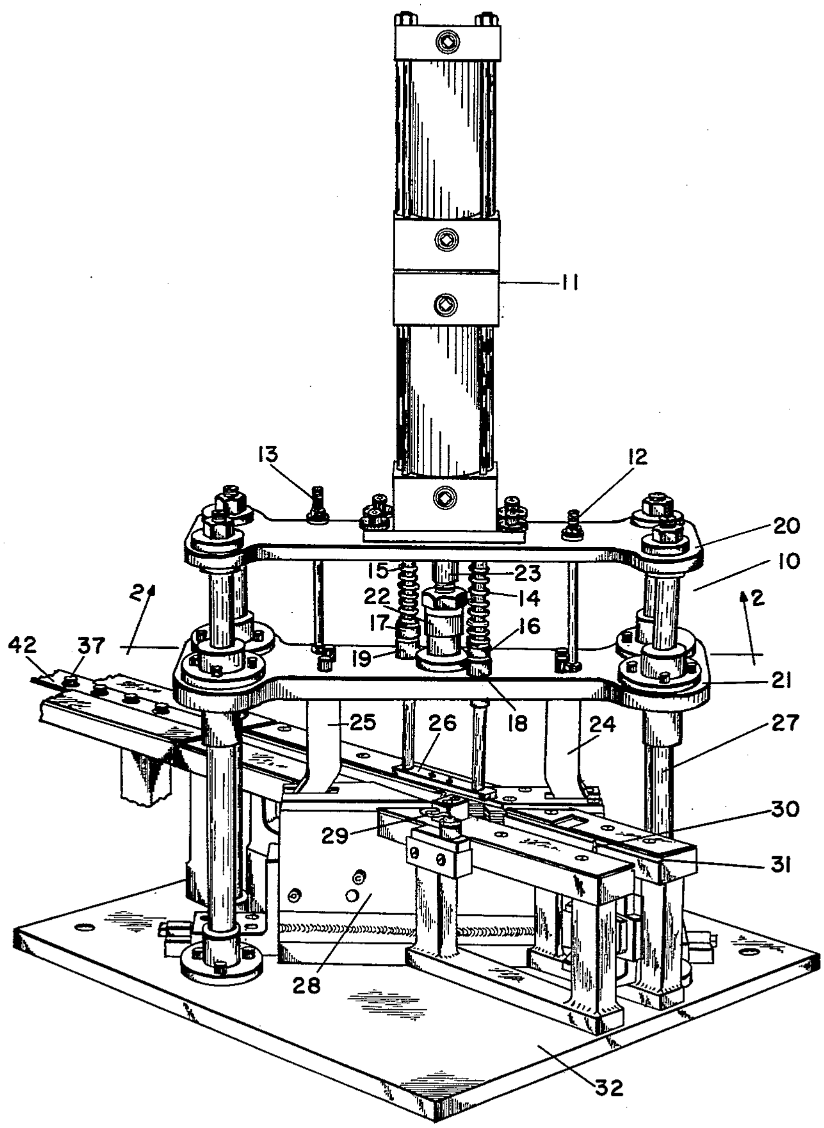
FIG. 1 is a general over-all view of the machine showing the main mounting base and the primary air cylinder which drives the straightener, and further showing the carrier boards on which semiconductor devices are conveyed through the machine.

The machine of the invention as illustrated in the drawings straightens the leads of very small transistor devices on a fully automatic, high speed production line wherein the devices are processed at a rate of the order of one unit per second. The transistors are supplied to the straightener machine from a previous operation on carrier boards which are moved to a work position at the straightener machine, and from there to another operation, all completely automatically. The transistors are not removed from the carrier boards for straightening, and no operator is required.

The carrier boards are transported in step-by-step fashion along a track, and their movement is controlled by driving and locating linkages. The straightening function is accomplished by two series of straightener members in the form of jaw-like plates, as mentioned above, and the jaws are sequentially closed onto each lead progressively along its length by means of driving cams. These cams are in the form of rods which have an angular or "dog-leg" section for engaging the plates and moving opposed pairs of plates inwardly toward the leads. The operation of the cams is timed with respect to the board driving and locating linkages to provide the desired automatic operation.

The simplicity and straightforwardness of the mechanical action results in trouble-free operation and there is a minimum of wear on the parts involved. This is an essential requirement where the machine is serving as one of the components in a mechanized mass production line. It should be re-emphasized that in dealing with leads which are closely spaced, as the leads of semiconductor devices usually are, the sequential straightening action provided by the thin plates and jaws of this machine is unusually effective. One type of device whose leads can be straightened by this machine has leads which are located on a .100" pin circle, and the leads are about .017" in diameter and .5" in length. From this it is apparent that the leads are quite delicate, and the space available between them is very limited. Yet, the machine straightens and positions the leads with great accuracy (to within a tolerance of plus or minus five-thousandths of an inch), and accomplishes this even though the leads may originally be badly entangled.

In order to provide a clear understanding of the apparatus or machine, its main parts will be described first, and then the operation of the machine and the manner in which the parts cooperate will be described fully.

FIG. 1 is an over-all view of the machine mounted on a main base plate 32. A housing 28 which encloses the plates that accomplish the straightening is mounted on the main base plate 32. Also secured to the main base plate are the main support posts 27. The tops of these posts 27 are rigidly secured to the top plate 20. Mounted on the upper surface of top plate 20 is the main oil air driving cylinder 11. The cylinder 11 has a shaft 23 which is directly coupled to a driving head 21. Head 21 moves freely up and down in a vertical direction, and transverse motion of the head 21 is prevented by the four posts 27. Two driving cams 24 and 25 are secured to the bottom face of the head 21, and they are driven up and down in a vertical direction by the action of the head 21. The head 21 is driven directly by shaft 23. The top plate 20 does not move.

The carrier board track 31 is shown in FIG. 1, and transistors are transported along this track on carrier boards such as 42. A board sensing arm 29, which causes the machine to be inoperative when no board is in the straightening position, is visible in FIG. 1. A holding head 26 holds the transistor units 37 securely in position during the lead straightening operation. The springs 14 and 15 and the collars 16, 17, 18 and 19 operate in conjunction with the holding head 26 to provide pressure on the tops of the units during the lead straightening portion of the operating cycle. A pair of rods 12 and 13 are adjustable to provide different amounts of travel of the head 21, thereby enabling the cams 24 and 25 to move pre-determined distances downwards to accommodate various lengths of device leads.

Figure 2:
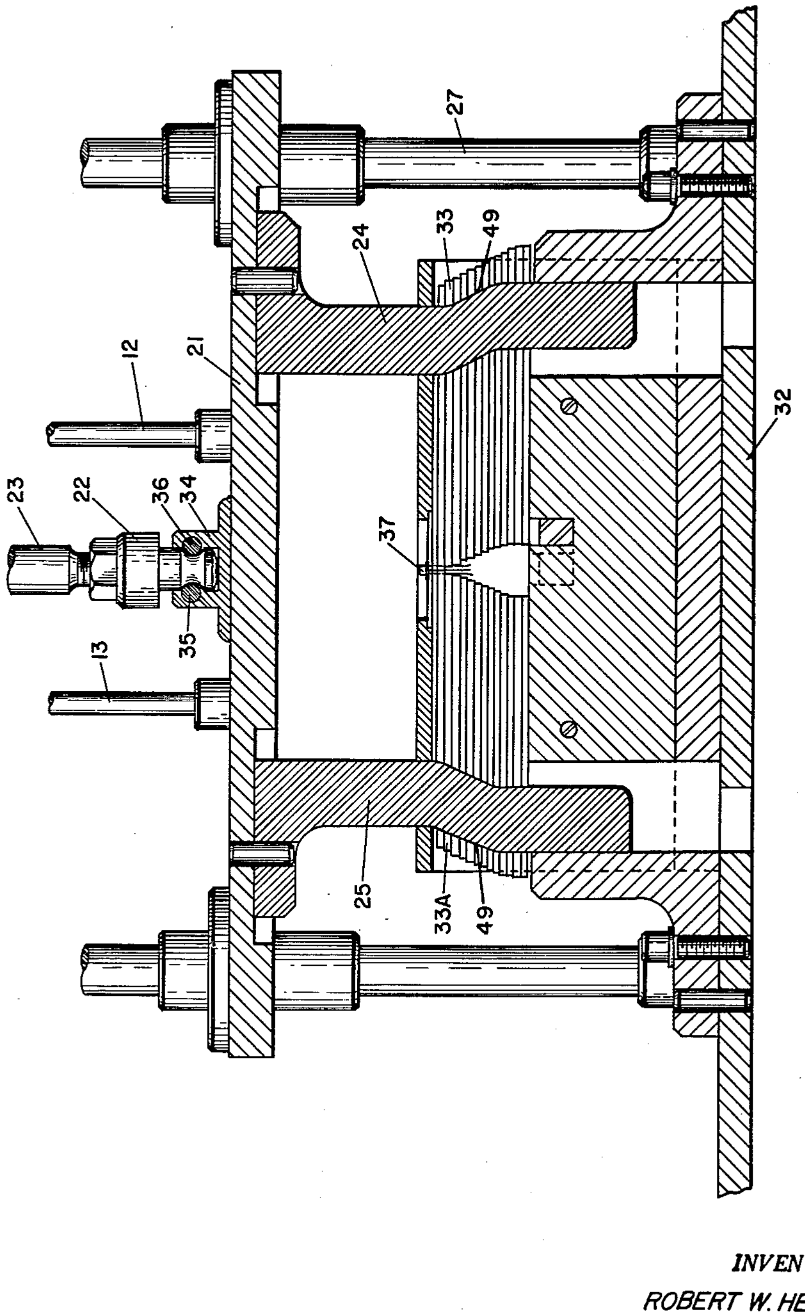
FIG. 2 is a sectional view taken along line 2—2 of FIG. 1, and shows two stacks of plates and two main driving cams which provide inward and outward motion of the plates so that the plates straighten the leads of a transistor device which is shown in a straightening position with the leads extending down between the stacks of plates.

FIG. 2 shows the two series or stacks of jaw-like plates 33 and 33A and their relation to a transistor 37 and the two driving cams 24 and 25. Both stacks of plates 33 and 33A are contained by the housing 28 shown in FIG. 1.

FIG. 2 also shows the nature of the coupling between shaft 23 and flange 34. Pins 35 and 36 are press fit into flange 34. Flange 34 is rigidly attached to head 21. The shaft 23 and the flange 34 have matching grooves all the way around. The pins 35 and 36 run straight through flange 34 and are held from moving by virtue of their press fit with flange 34. Thus flange 34 and shaft 23 are keyed together.

Figure 3:
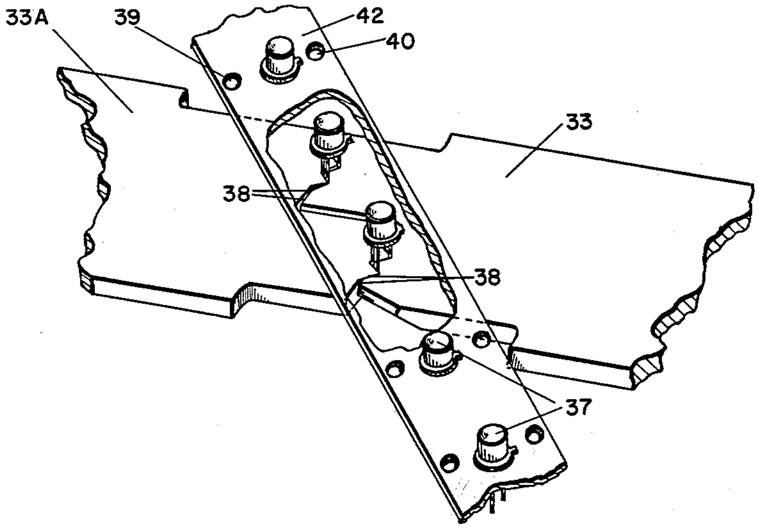
FIG. 3 is an enlarged fragmentary view showing a carrier board as it passes across the plates with transistor devices in position on the board and with one pair of plates moved in all the way and performing a straightening action on one portion of each of the three leads of two of the transistor devices.

FIG. 3 shows a detailed close-up view of the carrier board 42 holding transistor units 37 which are in an oriented position with their tabs pointing to the right. One pair of the plates 33 and 33A is shown in a fully inward position in direct contact with the leads, and the jaws 38 are pressing on the leads to provide the straightening and locating action. A portion of the carrier board 42 is broken away to reveal the jaws 38 of the plates. As can be seen from FIG. 3, the board 42 passes across the plates at approximately a 45° angle and this readily permits ganging of additional stacks of operating plates 33 and 33A to permit many units to be straightened at the same time. FIG. 3 also shows the board holes 39 and 40. These holes 39 and 40 are employed for board driving and board locating purposes as will be explained further.

Figure 4:
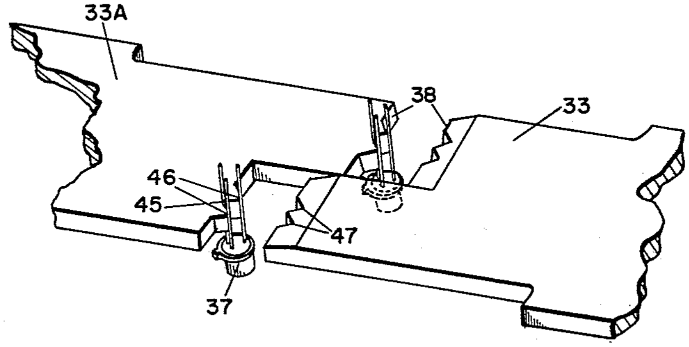
FIG. 4 is a fragmentary view of the under sides of a pair of plates which are moving inwards to perform the straightening action, and in this view the leads of the device are shown clearly in relation to the incoming plates and plate jaws.

FIG. 4 is another detailed close-up view of a pair of the plates 33 and 33A, this time in an upside down position. Two transistor units 37 are shown in the straightening position between the jaws 38. FIG. 4 provides a clearer insight as to the nature of the action of the jaws 38 on the leads of device 37. The orientation of the unit 37 is such that the one lead on the left resides in a V-cut groove 45 in the jaws 38, while the two remaining leads are placed at the peaks of the teeth 46. As plates 33 and 33A move in, the two V-notches 47 on the right move in around the two previously non-enclosed leads. Thus, the jaws 38 have a complementary configuration such that each lead is enclosed when the jaws are closed.

Figure 5:
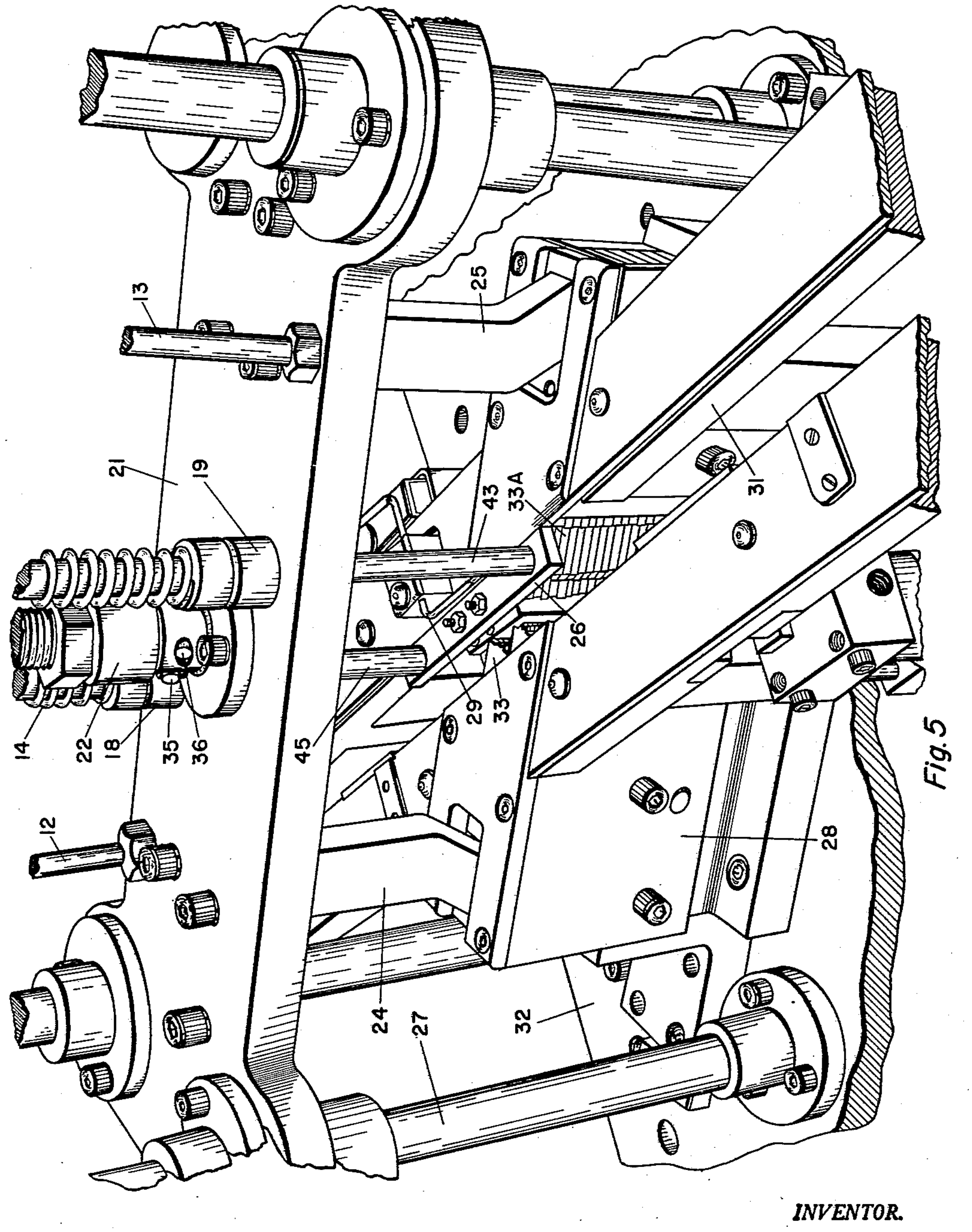
FIG. 5 is a view of the front of the machine showing the carrier board track area and the driving cams, and also showing at the center of the figure the straightener plates in a retracted position.

FIG. 5 is a detailed close-up view of the machine proper; again showing the plate housing 28, the cams 24 and 25 and their relation to the plate housing 28. Plates 33 and 33A are shown in a retracted position in which the plates 33A are only partially visible underneath the holding-head 26. The track 31 is quite clearly visible. The action of the holding head 26 is so synchronized with the board driving linkage that just after the boards have come to rest, the head 26 moves down and presses on the tops of the units 37 (FIG. 3) which are in the lead straightening position and holds them firmly so that the leads can be operated upon.

Figure 6:
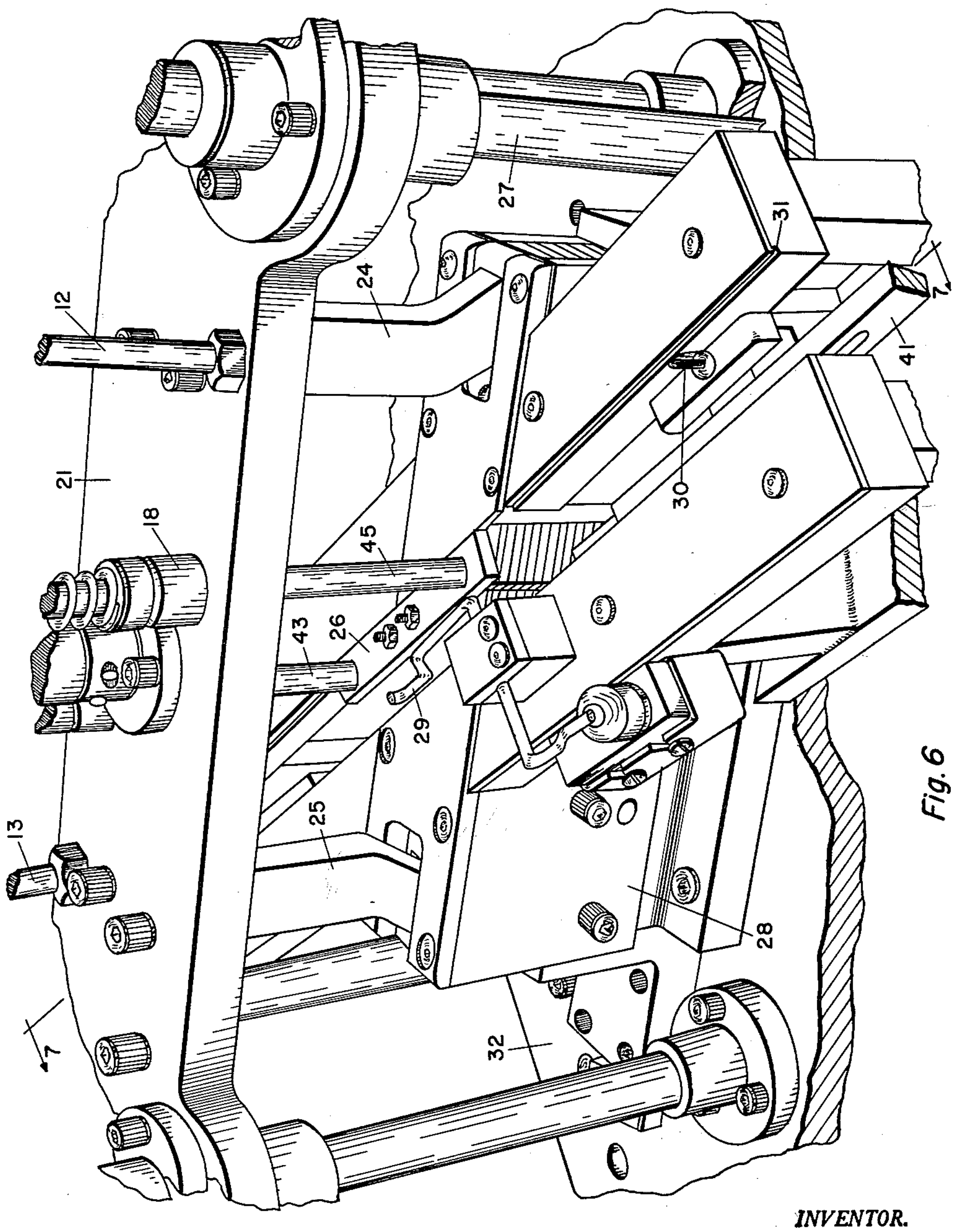
FIG. 6 is a view of the back of the machine which shows in particular a board sensing arm and also a board locating pin, the latter being at the lower right of this drawing.

FIG. 6 is a view looking in from the rear of the machine and shows clearly the board sensing arm 29. This sensing arm 29 actuates an electrical switch to prevent machine operation at times when no board is in the lead straightening position. The board driving linkage 41 is shown below the track 31. The board locating pin 30 is shown in FIG. 6 above and to the right of the board driving linkage 41. The purpose of the board locating pin 30 is to provide positive and rigid positioning of the board during the lead straightening operation, as will be explained.

Figures 7, 8:
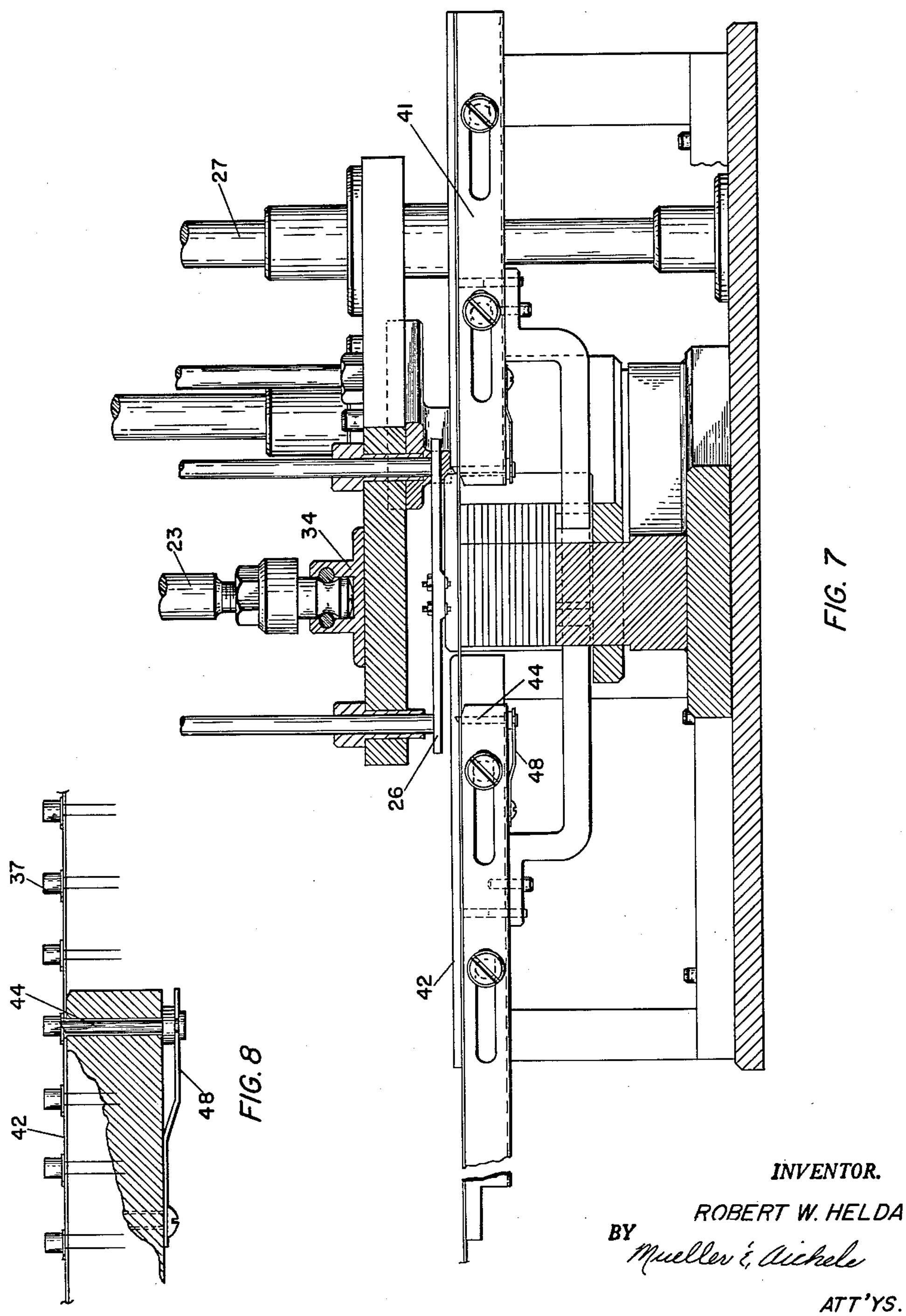
FIG. 7 is a sectional view taken along line 7—7 of FIG. 6 and shows the linkage for driving the boards.
FIG. 8 is a fragmentary view of a portion of the board driving mechanism and shows in particular the driving pin which engages holes in the boards and provides the force for advancing the boards.

FIG. 7 clearly shows the location of the board driving linkage 41 and its relation to the entire machine. FIG. 8 shows the manner in which the board driving pin 44 fits into the board 42 during the board driving part of the operating cycle. Pin 44 is constrained upwards by the spring 48.

An electrical-mechanical-pneumatic control system is provided for the machine, and this will not be described since it is not considered essential to an understanding of the invention. The action of the board driving linkage 41, the cams 24 and 25, the board locating pins 30 and the board sensing arm are all caused to operate in proper sequence by the control system. The prime movers for all of these actions are air cylinders.

The operating cycle of the machine will now be described referring to the individual views of the drawings as they best illustrate the operation. The boards 42 (see FIG. 1) enter the machine moving from left to right and travel in the track 31 carrying the transistor devices 37. The track 31 is grooved on each side, and these grooves constrain and direct the motion of the boards 42 through the machine. The motion of the board 42 is determined by the action of the board driving linkage 41 (see FIG. 7). This linkage 41 has an intermittent motion from left to right as viewed in FIG. 7, which causes the board 42 to advance a specific distance so as to bring two transistors into positions between the operating plates 33 and 33A as shown best in FIGS. 3 and 4. The board moves a distance equal to twice the longitudinal spacing between the board holes 39 (FIG. 3). The board 42 comes to rest for a period of time and then is caused to repeat its forward movement. The board driving linkage 41 is driven by an air cylinder which is not shown.

The driving action on the boards 42 is effected by the pins 44, one of which is visible in FIGS. 7 and 8. Pins 44 are so bevelled that when the linkage 41 is driven to the right, the pin 44 projects through the hole 39 and above the board 42 and thereby is engaged with the board 42 and causes it to move. When the driving linkage 41 is driven back to the left, as viewed in FIG. 7, the bevelled top of the pins 44 are such that they readily slide out of the hole 40. The pins slide under the board 42 moving back a distance equal to twice the spacing between two adjacent holes 39. The pins 44 then engage new holes and the next forward driving stroke takes place. The pins 44 are part of the linkage 41, and their spacing along the linkage is slightly less than one board length, thereby insuring that at least one pin 44 will be engaged with the board during the forward driving part of the cycle. The spring 48 maintains an upward pressure on pin 44 and insures that pin 44 will project through the board whenever a hole 39 is directly above the top of pin 44.

In the machine shown, two transistor units 37 (FIG. 3) are operated upon by the jaws 38 at the same time. FIG. 4 shows the manner in which the units 37 reside in position between the jaws 38 just prior to the inward movement of the plates 33 and 33A (see also FIG. 2). The board 42 in which the units 37 are held must come to rest before the straightening action can be effected. It can be seen therefore that the motion of the board 42 is such that there is a forward travel sufficient to bring two transistors into position between the straightener plates 33 and 33A, a period of rest or non-motion, followed by an additional forward motion of the board 42 sufficient to bring the next two transistors to the work position. After the board 42 comes to rest, a board locating pin 30 (FIG. 6) moves upward and into one of the holes 39 and positively locates the board 42, thereby preventing motion of the board 42 which might interfere with the straightening action. The action of the pin 30 is so timed that immediately following the straightening step, the pin 30 retracts downward permitting the boards 42 to be driven forward.

A board sensing arm 29 (see FIG. 6) permits operation of the machine only if a board 42 is underneath the sensing arm 29 thereby causing actuation of a switch connected to this sensing arm. The purpose of this is to allow the machine to remain idle during the periods when no boards 42 are in position under the holding head 26. After a board 42 has come to rest, the oil air cylinder 11 makes a downward stroke thereby driving shaft 23 (see FIG. 2) and the attached head 21 downwards causing the cams 24 and 25 and also the holding head 26 (see FIG. 1) to move downwards. The action of holding head 26 is such that it presses on the tops of the devices 37 (see FIG. 2) and holds them securely to the boards 42 to permit the lead straightening action to take place. The head 21 moves down causing cams 24 and 25 to move down into the plate housing 28, thereby forcing the cams 24 and 25 into the stack of plates 33 and 33A. The dog-legged or angled central portions of cams 24 and 25 (see FIG. 2) initially cause the uppermost pair of plates 33 and 33A to be driven towards each other, and the plates are held closed by the upper portion of the cams. As the cams 24 and 25 proceed further down, additional pairs of plates 33 and 33A are sequentially driven towards each other and are held closed by the cams.

The plates 33 and 33A of each pair move toward the device 37 and compress the leads of the device along a limited portion of their length. FIGS. 3 and 4 clearly show the nature of the action of two of the plates 33 and 33A and their jaws 38 on the leads of the device 37. It can be noted that one of the leads of the device 37 lies in the bottom of a V-groove 45 in the jaws 38 while the other two leads are positioned at the peaks 46 of the jaws 38 and are finally enclosed by two more V-grooves 47 on the operating face of plate 33.

The top pair of plates in the series 33 and 33A engage and compress a portion of each lead near the body of the transistor device. Near the body portion, the leads are held fairly close to their optimum positions by the body. It is of considerable advantage to start the straightening action near the body because in this region the location of each lead is predictable, and this ensures that the leads will be received in the respective V-notches in the jaws 38. The top pair of plates begins the straightening action and holds the leads for the next pair of plates. Now, the portions of the leads right next to the top pair of plates are close enough to their desired positions to ensure that they will be received in the respective V-notches in the jaws 38. Thus, each pair of straightener members positions the leads sufficiently for the next pair of straightener members to operate effectively. If the leads are originally entwined, this sequential straightening action causes them to be separated and put into precisely located positions with respect to each other.

Also, the sequential action ensures that straightening pressure is applied to each lead all along its length so that the lead is positioned very accurately with no tendency to spring back to a distorted condition. By way of contrast, if a lead is clamped between two surfaces which extend the full length of the lead, there is much more tendency for the lead to spring back. One difficulty with this approach is that if the diameter of the lead is not uniform throughout its length, pressure will be concentrated at the portion having the largest diameter and in some cases no pressure will be applied to smaller portions of the lead. The leads are rarely completely uniform in diameter throughout their length because reasonable tolerances on diameter must be allowed in a practical device. The sequential straightener of the invention is compatible with fairly wide tolerances on lead diameter because each pair of straightener members act on only a short portion of each lead. This is accomplished by making the blades or plates 33 and 33A quite thin, and of course the thickness of the plates and the number of plates in each stack can be varied to accommodate the particular leads to be straightened.

The motion of the cams 24 and 25 (see FIG. 2) is limited by the adjustment that is made on the adjustable stop rods 12 and 13. (See FIG. 1.) These rods 12 and 13 are secured permanently to the head 21 and extend upwards through the top plate 20. Adjustment of the nuts on the upper ends of rods 12 and 13 determines the distance which the cams 24 and 25 and also the head 21 can move downwards. The rods 12 and 13 move freely through holes in the top plate 20, and the position of the nuts on the rods 12 and 13 determines the point at which the plate 21 is prevented from moving further downwards. The head 21 is prevented from moving in any transverse direction by the close fit between head 21 and four rods 27.

The action of the holding head 26 will be further described. The oil-air cylinder 11 (see FIG. 1) causes the shaft 23 to move downwards and this causes the head 21 to move downwards a similar distance. Since collars 18 and 19 are secured permanently to the top face of head 21, they move downwards with plate 21 and thereby partially relieve the compressive forces in springs 14 and 15. The upper ends of springs 14 and 15 operate against the bottom face of the top plate 20. The collars 16 and 17 which constrain the springs 14 and 15 at their lower ends are secured rigidly to the rods 43 and 45 (see FIG. 5) of the holding head 26. Therefore the pressure established on the tops of the devices 37 while they are in the straightening position is determined by the expansive forces of the springs 14 and 15 acting between the lower face of the top plate 20 and the collars 16 and 17 which are rigidly attached to the rods 43 and 45. When the air cylinder causes an upward motion of the shaft 23, the head 21 moves upward thereby causing collars 18 and 19 to force upwards against collars 16 and 17. This causes the rods 43 and 45 to move upwards placing springs 14 and 15 under additional compression, and the holding head 26 moves upwards away from the units 37.

The need for a mass production machine for untangling and straightening the leads of transistor devices is met by the invention. The thin blades or plates of the machine having jaws which can move between and around the leads starting at a point close to where the leads come out of the device and progressing along the length of the leads provides a straightening action which takes place in a series of steps, and this positions the leads very accurately. The leads have no tendency to spring back to their original positions. The progressive straightening action of the plate pairs is caused by a simple, effective pair of cams. The over-all action of the machine is straightforward thereby allowing fully automatic, trouble free operation.

What is claimed is:

1. Apparatus for straightening and positively locating a plurality of leads of a semiconductor device which extend in the same direction from a body portion thereof, said apparatus including in combination a plurality of movable straightener members adapted to be actuated sequentially so as to apply force to successive portions of each lead of the semiconductor device in a step-wise fashion beginning near the body portion of the device and progressing away from the body portion lengthwise of the leads, means supporting said straightener members forming at least two series each comprised of a plurality of said members arranged such that pairs of said straightener members are adapted to close on said leads and compress the same, with each pair of said straightener members having relatively thin jaw-like portions positioned directly opposite each other for engaging limited portions of the leads and for positioning the leads with respect to each other, means for providing a semiconductor device at a work position in said apparatus in which the leads of the device extend between said jaw-like portions of said straightener members for successive engagement thereby, and actuating means operatively connected to said straightener members providing sequential closing of said jaw-like portions on said leads beginning with actuation of the pair of straightener members closest to the place where the body portion of the semiconductor device is positioned in operation of said apparatus and continuing with actuation of successive pairs of straightener members, whereby in the operation of said apparatus the first pair of straightener members squeezes and holds a portion of each lead near the body portion of the device thereby insuring that the leads are sufficiently straightened that the next pair of straightener members can close and further straighten the leads, with each successive pair of straightener members positioning and holding the leads for the next pair of members until the leads are fully straightened.

2. Apparatus for straightening the lead portions of electrical components by a step-by-step straightening action, said apparatus including in combination, at least two series of straightener members, with each such series including a plurality of said straightener members each of which is movable independently of the others toward and away from a work position at said apparatus for a component whose lead portions are to be straightened, means supporting said straightener members in opposed pairs such that each straightener member of one series has a corresponding straightener member of the other series, jaw means on said straightener members providing on each pair of said members complementary jaws positioned opposite each other and adapted to squeeze the lead portions of a component between them, and means for successively moving the straightener members of each series thereof toward said work position, such that in the operation of said apparatus said jaws close in succession on a lead and apply compressive pressure thereto in steps progressing lengthwise of the lead, thereby positively locating and straightening the lead.

3. Apparatus for the processing of components which have at least one electrical lead extending from a body portion thereof so as to straighten such leads by a step-by-step straightening action, said apparatus including in combination, two series of straightener members, with each such series including a plurality of said straightener members each of which is movable independently of the others toward and away from a work position for a component at said apparatus, means supporting said straightener members in pairs such that each straightener member of one series is located opposite a corresponding straightener member of the other series, jaw means on said straightener members providing on each pair of such members opposed jaws adapted to apply compressive straightening pressure to a portion only of a lead of a component, actuating means for said straightener members operative to close said jaws successively and maintain the same in a fixed position on a lead of a component beginning by closing the pair of straightener members near the body portion of such component and continuing by closing the individual pairs of straightener members successively and progressing along the length of such lead, thereby applying straightening pressure progressively along the length of the lead for positively straightening the same.

4. Apparatus for straightening the lead portions of electrical components by a step-by-step straightening action, said apparatus including in combination, two series of straightener members, with each such series including a plurality of said straightener members each of which is movable toward and away from a work position for a component whose lead portions are to be straightened, means movably supporting said straightener members on opposite sides of said work position such that each straightener member of one series is located opposite a corresponding straightener member of the other series, jaw means on said straightener members providing on each pair of such members jaws having complementary protrusions and recesses adapted to close on and simultaneously apply compressive forces to a plurality of leads of a component at a limited portion of each lead, and means for successively moving the straightener members of each series thereof toward said work position and for maintaining each pair of said straightener members in a fixed closed position such that said jaws are operative to close in succession on said leads and apply compressive forces thereto in steps progressing lengthwise of the leads thereby positively locating and straightening the leads.

5. Apparatus for stressing a work piece by applying increments of force to it in steps progressing along a given dimension of the work piece, said apparatus including in combination a series of plate-like operating members each of which is movable toward and away from a work position for a work piece which is to be stressed, means supporting said operating members in parallel relation with each other and with end portions of said members positioned to engage and stress a work piece at discrete portions thereof aligned along a given dimension of such work piece, cam means in driving relation with said operating members for successively moving said operating members from a retracted position thereof toward said work position, said supporting means for said operating members allowing only reciprocal movement thereof in a direction substantially perpendicular to said dimension of such workpiece when supported at said work position, and means for driving said cam means in a direction transverse to said operating members for causing said operating members to advance successively toward said work position such that in the operation of said apparatus a first operating member in the series thereof engages and stresses a selected portion of said work piece and each successive operating member of said series engages and stresses said work piece at discrete portions thereof which are aligned along said given dimension with respect to said selected portion.

6. Apparatus for stressing a work piece by applying increments of force to it progressively along a given dimension of the work piece, said apparatus including in combination a series of plate-like operating members each of which is movable toward and away from a work position for a work piece which is to be stressed, means supporting said operating members in parallel relation with each other and with end portions of said members positioned to engage and stress a work piece at discrete areas thereof aligned along a given dimension of such work piece, cam means in driving relation with said operating members for successively moving said operating members from a retracted position thereof toward said work position, said cam means having a portion in angular relation with respect to said operating members adapted to actuate said operating members in succession such that in the operation of said apparatus a first operating member in the series thereof moves first toward said work position and each successive operating member of said series moves in turn toward said work position, and means for driving said cam means in a forward stroke for successively advancing said operating members toward said work position and in a reverse stroke for retracting said operating members from said work position.

7. Apparatus for straightening and positively locating a plurality of electrical leads which project in the same direction from a body portion of a device by successively squeezing incremental portions of such leads distributed along the length thereof, said apparatus including in combination at least two series of straightener members with each such series being comprised of a plurality of said straightener members, means supporting said straightener members in opposed pairs such that each straightener member of one series has a corresponding straightener member of the other series, said supporting means allowing only reciprocal movement of at least one straightener member of each said pair toward and away from a work position for a device in said apparatus, said straightener members of each said pair thereof having opposed portions forming jaws adapted to squeeze a limited portion of such lead between the same, and actuating means operatively connected to said straightener members for moving the same in succession toward said work position to sequentially close said jaws on the leads of a device and for causing said jaws to remain closed and squeeze such leads between the same until the leads are fully straightened, whereby in the operation of said apparatus said straightener members are actuated sequentially by said actuating means so that each pair of straightener members positions and holds the leads for the next pair of straightener members in the sequence thereof.

References Cited in the file of this patent

UNITED STATES PATENTS

| | | |
|---|---|---|
| 1,760,629 | Brindle | May 27, 1930 |
| 2,120,877 | Uber | June 14, 1938 |
| 2,867,262 | Ainsworth et al. | Jan. 6, 1959 |
| 2,928,452 | Diggle et al. | Mar. 15, 1960 |